(12) United States Patent
Bichigov et al.

(10) Patent No.: US 8,699,761 B2
(45) Date of Patent: Apr. 15, 2014

(54) METHOD FOR EVALUATING QUALITY OF IMAGE REPRESENTING A FINGERPRINT PATTERN

(76) Inventors: Vladimir Nickolaevich Bichigov, Miass (RU); Pavel Anatolievich Zaytsev, Miass (RU); Alexandr Vladimirovich Moksin, Miass (RU); Ivan Borisovich Shapshal, Miass (RU)

(*) Notice: Subject to any disclaimer, the term of this patent is extended or adjusted under 35 U.S.C. 154(b) by 8 days.

(21) Appl. No.: 12/663,862

(22) PCT Filed: Oct. 21, 2009

(86) PCT No.: PCT/RU2009/000584
§ 371 (c)(1),
(2), (4) Date: Dec. 10, 2009

(87) PCT Pub. No.: WO2010/071476
PCT Pub. Date: Jun. 24, 2010

(65) Prior Publication Data
US 2011/0235935 A1  Sep. 29, 2011

(30) Foreign Application Priority Data
Dec. 19, 2008 (EA) .................................. 200900144

(51) Int. Cl.
*G06K 9/00* (2006.01)

(52) U.S. Cl.
USPC .......................................... 382/124; 382/125

(58) Field of Classification Search
USPC ......... 382/124, 125, 126, 127, 313, 314, 315;
340/5.52, 5.53, 5.82, 5.83, 356;
283/68, 69, 70, 78; 396/15; 713/186
See application file for complete search history.

(56) References Cited

U.S. PATENT DOCUMENTS

| 5,963,656 | A | 10/1999 | Bolle et al. | |
| 7,194,143 | B2 * | 3/2007 | Sowa | 382/265 |
| 7,835,546 | B2 * | 11/2010 | Abe | 382/115 |
| 2003/0012452 | A1 * | 1/2003 | Trifonov et al. | 382/275 |
| 2006/0120575 | A1 | 6/2006 | Ahn | |

\* cited by examiner

*Primary Examiner* — Brian Le

(57) ABSTRACT

A method for evaluating quality of image representing a fingerprint pattern is provided, the method including performing a filtering process on a region of the image including a digital filtering of the selected region successively performed a certain number of times. According to the method, convergence of said filtering process is determined, and the image within the region is classified as an image with identifiable pattern if the filtering process is convergent, whereas the image within the region is classified as an image with unidentifiable pattern if the filtering process is nonconvergent. The digital filtering is performed using a filter adapted to at least one of the following local image parameters: curvature of dermal ridges, scale and tilt angle of dermal ridges.

4 Claims, No Drawings

METHOD FOR EVALUATING QUALITY OF IMAGE REPRESENTING A FINGERPRINT PATTERN

CROSS-REFERENCE TO RELATED APPLICATIONS

This application claims the benefits from International Application PCT/RU2009/000584 filed on Oct. 21, 2009 and priority application EA200900144 filed on Dec. 19, 2008. The contents of these applications are hereby incorporated by reference and in their entirety.

FIELD OF THE INVENTION

The invention relates to methods for evaluating quality of image representing a fingerprint pattern, in particular to a method for evaluating quality of image representing a fingerprint pattern based on the evaluation of image changes on successive iterations of digital filtering of said image.

BACKGROUND ART

Fingerprint images are widely used for personal identification purposes, in particular in pass entry systems, automated dactyloscopic identification systems, and similar dactyloscopic systems. Automatic recognition of a fingerprint pattern consists in forming an image skeleton of the original pattern and determining dactyloscopic features, namely endings and triplets. Prior to skeletonizing, where possible, noises are removed from the original image by digital filtering. The main content of a fingerprint image is a dermal lines pattern. Typically, the whole fingerprint image has varying quality. Dermal lines of some regions are unidentifiable due to the lack of characteristic ridges and concaves because of skin defects or partial loss of the pattern information during the fingerprint formation, capture and processing. Factors affecting the quality of a fingerprint image are set forth below:
- original condition of a skin fingerprint pattern;
    - aggressive influences, mechanical influences, wrinkles, age-related changes, and changes caused by skin diseases;
    - optical system quality, digitization quality, focusing errors, optical distortions, low resolution, insufficient or excessive contrast, nonlinear luminance transmission;
    - noises peculiar to a dynamic process of image formation, such as deformation, motion aberration, image break, dirt, etc.

These noises in the aggregate result in that some regions of a fingerprint image become unidentifiable. When forming an image skeleton for such a region, the system "detects" and marks false dactyloscopic features on the image. Such false features hinder automatic comparison of given print to other prints, because the probability of type 1 and 2 errors is increased. Thus, automatic processing of unidentifiable areas when recognizing fingerprint patterns results in dramatic deterioration of the dactyloscopic system characteristics. The problem can be solved by detecting such regions of unidentifiable pattern and excluding them from the pattern to be skeletonized, and further determining dactyloscopic features. In first dactyloscopic systems, an expert determined visually the quality of image regions, and marked unidentifiable regions on the image. Said method was sufficiently precise, but very laborious. Therefore, different automatic methods for evaluating a fingerprint pattern are presently used. A measure of image region quality obtained someway or other is used to decide whether further processing of said region is reasonable. Furthermore, in some dactyloscopic systems, the measure of image region quality is used as a weight factor of a dactyloscopic feature found on said region when automatically comparing two patterns.

U.S. Pat. No. 5,963,656 discloses a method for determining the quality of fingerprint images. Said method includes selecting at least one block of pixels in a fingerprint image and determining whether the selected block of pixels has a prominent direction with further referring them to directional or non-directional blocks, respectively. Then, given block is determined as a foreground block or background block, depending on the intensity of pixels of the block compared with neighboring pixels. For this purpose, the sum of intensity differences between each pixel in the block and neighboring pixels is compared with a background threshold, said each pixel being classified as a foreground pixel if said sum is higher than said background threshold; otherwise, said each pixel is classified as a background pixel. Then the amount of background pixels in each block is compared to the block threshold. If said block threshold is exceeded, the whole block is determined as background; otherwise, the block is determined as foreground. Further, the regions are formed containing adjacent directional foreground blocks, the regions being used during further processing of the fingerprint image. According to said method, the image quality measure is determined as a ratio of the areas of all regions formed in this way to the area of the whole fingerprint image.

The US patent application 20060120575 discloses a method for classifying fingerprint image quality, the method including steps of dividing a fingerprint image into a plurality of blocks; calculating and vectorizing parameters to determine the quality of each block; obtaining quality classification for each block based on said parameters; and selecting a representative value of the quality classification values, which is defined as a measure of quality of the dactyloscopic image.

The measure of quality evaluated according to the above-mentioned methods does not consider characteristics of the digital filtering system, and therefore is not optimal for determining regions of identifiable and unidentifiable pattern when digitally filtering using different digital filtering and processing systems.

Bergengruen (see. O. Bergengruen. Matching of fingerprint images. Technical report. Dept. of Numerical Analysis (CeCal), School of Engineering, University of the Republic of Uruguay, Montevideo. 1994.) proposed a quality measure based on the evaluation of the signal/noise ratio in each point. Such evaluation presumes that the image improved by filtering can be classified as "true image", and the luminance range difference between the original image and the improved image is classified as "noise". Bergengruen also suggested using the quality measure calculated in this way as weight factors in comparison algorithms. This method allows of determining regions of a fingerprint image where pattern is destroyed irretrievably. However, the regions having low signal/noise ratio but with recoverable pattern will also be classified as unidentifiable. In particular, this occurs on the regions of an image where dermal lines are strongly fragmented due to peculiarities of a person's skin structure. According to said method, such regions will be classified as unidentifiable.

Thus, strongly fragmented dermal lines, for example dermal lines consisting of dots or short sections, cannot be classified as recoverable according to known methods, though they can be visually perceived by an examiner.

BRIEF SUMMARY OF THE INVENTION

The object of the present invention is providing a method for evaluating quality of image representing a fingerprint pattern, in which the determination of regions with unidentifiable pattern with high accuracy is provided, and in addition regions of the image of low quality and/or regions of the image with strongly fragmented but recoverable dermal lines are classified as regions with identifiable pattern. This method should provide the evaluation of fingerprint image quality comparable with that provided by a visual analysis performed by an expert. This method also should consider characteristics of an image digital filtering algorithm used and determine regions with identifiable and unidentifiable pattern depending on specific algorithm.

The object is achieved by providing a method for evaluating quality of image representing a fingerprint pattern including selecting a region in a fingerprint image and performing a filtering process comprising a digital filtering of the selected region successively performed at least three times, wherein convergence of said filtering process is determined, and the image within the region is classified as an image with identifiable pattern, if the filtering process is convergent, whereas the image within the region is classified as an image with unidentifiable pattern, if the filtering process is nonconvergent.

In one preferable embodiment, the digital filtering is performed a predetermined number of times.

In another preferable embodiment, the digital filtering of the selected region is performed using a filter adapted to at least one of the following local image parameters: curvature of dermal lines, scale and tilt angle of dermal lines.

DETAILED DESCRIPTION OF THE INVENTION

The claimed method is based on fast convergence of a filtering process including repeatedly and successively performing a digital filtering of a fingerprint image region, while improving the image quality.

In a preferred embodiment, the digital filtering is performed using an adaptive filter. As applied herein, the adapted filter is a filter adapted to local characteristics of an image, such as tilt angle of dermal lines, curvature and scale of dermal lines, e.g. a filter described in Russian patent 2329537 incorporated herein by reference. The tilt angle of dermal lines, scale and curvature of dermal lines can be determined using any method known from prior art.

Preferably, a filter is used having zero response to fixed signal and having no influence on sinusoidal wave. With such a filter selected, the filtering process is exhausted on increasing of iteration index, and a dynamic process of changing the filtered image defines the difference between the real image and the idealized "model" image of a fingerprint pattern.

An example of performing filtering process of a fingerprint pattern image is described below. The image is presented as a rectangular array of pixels with different gray gradations in spatial domain. In further description, the following designations are used:

$G[k][i,j]$—brightness value, $G \in [0, Gmax]$, where $Gmax$—maximum brightness value;

$k$—iteration index of the filtering process, $k=0$ corresponds to the original image, $k \in [0,n]$, where n is the number of iterations of the filtering process;

$i$—the number of a row of the array of pixels, $i \in [0,M]$, where M is the quantity of pixels in the array column;

$j$—the number of a column of the array of pixels, $i \in [0,N]$, where N is the quantity of pixels in the array row. Therefore, an (i, j) pair represents a pixel in the rectangular array of pixels.

The digital filtering is applied to each pixel of the image separately. As a result of performing each subsequent iteration of digital filtering process, the brightness value for this pixel is obtained. This value is determined based on the brightness value of given pixel and pixels in certain neighborhood of given pixel after applying previous iteration. Dimensions of this neighborhood are defined using the filter mask, and the neighborhood position for each pixel to be filtered is changed by displacing the filter mask. The selection of the filter mask dimensions is crucial. If the mask is too large, it becomes impossible to evaluate the dynamics of the image changes, and if the mask is too small, the number of iterations increases unreasonably. In was found experimentally, that the optimal characteristic linear dimension of the filter is 1-1.5 of the distance between adjacent ridges at the current dot.

Thus, the improved image obtained after performing the (k)th iteration of the filtering process is a result of applying the filter to the image obtained after performing the (k−1)th iteration: $G[k][i,j]=F(G[k-1][i,j], G_{Nb}[k-1][i,j]_{Nb})$, where $G_{Nb}[k-1][i,j]$ is the brightness of pixels in the neighborhood of the pixel to be filtered. F represents the influence of the filter adapted to the tilt angle of dermal lines, scale and curvature of dermal lines on each pixel (i,j) of the image.

Several iterations of the image filtering process are performed $G[0] \rightarrow G[1] \rightarrow G[2] \rightarrow \ldots G[n]$, where n is the number of an iteration. Here, $G[1]=F(G[0], G_{Nb}[0])$; $G[2]=F(G[1], G_{Nb}[1]) \ldots G[n]=F(G[n-1], G_{Nb}[n-1])$. For each pixel (i,j) of the image, n values of $W[n][i][j]$ are calculated, said values being a measure of difference between images after performing (n)th and (n−1)th iterations for given pixel.

Mean-square deviation, correlation, absolute difference and other measures of difference can be used as a measure of difference $W[n][i][j]$. These values are used as an input vector for quality evaluation of the original image and determination of regions inapplicable for coding, i.e. regions where the image structure cannot be recovered.

The W[n] values are preferably calculated as follows. First, the images G[k] are binarized, thus obtaining values of BG[k], where BG[k] is a binary image. If a filter with properties mentioned above is used, i.e. the filter has zero response to a fixed signal and has no influence on the sinusoidal wave, the binarization is performed simply according to the sign of the brightness of the image pixel. Further, n differences SUB[k] between images are calculated, where SUB[k] is a pixel-by-pixel difference between images BG[k] and BG[k−1]. Thus, values SUB[2], SUB[3], . . . SUB[n] are obtained. The value SUB[0] is therefore not calculated.

The value SUB[k][i][j] at the point (i,j) is assigned 1 if the binarized values of the corresponding pixel after two subsequent iterations (k−1) and k are equal, and 0, if the binarized values of the corresponding pixel after two subsequent iterations (k−1) and k are not equal. Images SUB[k] are smoothed over a region comprising several ridges using one of the known methods, thus obtaining values SMTH_SUB[k]. For each pixel of the image, n values SMTH_SUB[k][i][j] are obtained, and, respectively, n values W[1][i][j], W[2][i][j], . . . W[n][i][j] are obtained, characterizing the difference between the images obtained after (k)th and (k−1)th iterations, where $W[k][i][j]=SMTH\_SUB[k][i][j]$.

Further, convergence of the filtering process for each pixel of the image after n iterations is determined. In practice, n is preferably set at no less than 3. In a preferable embodiment of the present invention, the vector obtained for each pixel of the image on the basic of n values of W[k][i][j], is fed to the input of a neuron network, which determines whether the pixel to be analyzed pertains to the region of the image with identified pattern, or the image in this pixel is destroyed irretrievably, and therefore the pixel should be classified as pertaining to the region of the image with unidentified pattern.

In yet another embodiment, the convergence criterion can be determined as non-exceedance of the absolute approximation |W[n][i][j]−W[n−1][i][j]| or relative approximation $$\frac{|W[n][i][j] - W[n-1][i][j]|}{W[n][i][j]}$$

of a predetermined value on subsequent iterations (n−1) and n. If the process is convergent, corresponding pixel is classified as pertaining to the region of the image with identifiable pattern, and if the filtering process is nonconvergent, the pixel is classified as pertaining to the region of the image with unidentifiable pattern.

It should be noted that while the present invention is described by means of the specific embodiment thereof, other embodiments of the present invention are possible without departing from the spirit and scope of the present invention.

We claim:

1. A method for evaluating quality of image representing a fingerprint pattern, the method including
    selecting a region in a fingerprint image and performing a filtering process including digital filtering of every pixel (i,j) of the selected region successively performed at least three times,
    characterized in that
    for every pixel of the selected region n values W[n][i][j] are calculated, said values being a measure of difference between the brightness values of this pixel after performing the (k)th and (k−1)th iteration for the selected region, and
    providing said values as an input vector to classify the pixel as pertaining to an identifiable or unidentifiable region of the image.

2. The method according to claim 1, characterized in that the digital filtering is performed a predetermined number of times.

3. The method according to claim 1, characterized in that said digital filtering is performed using a filter adapted to at least one of the following local image parameters: curvature of dermal lines, scale and tilt angle of dermal lines.

4. The method according to claim 2, characterized in that said digital filtering is performed using a filter adapted to at least one of the following local image parameters: curvature of dermal lines, scale and tilt angle of dermal lines.

* * * * *